Feb. 12, 1963 W. HOFFMANN 3,077,158
PRINTING DEVICE
Filed Dec. 2, 1960 12 Sheets-Sheet 1

INVENTOR
WALTER HOFFMANN
BY Robert E. Sandt
AGENT

| TIME POSITION | WRITING | COMPARING | RESETTING | RECORD CARRIER ALIGNMENT |
|---|---|---|---|---|
| 0.0 | --- | --- | --- | --- |
| 5.5 | a ↔ I | --- | --- | --- |
| 10.0 | --- | a ↔ 1 | --- | --- |
| 10.5 | --- | --- | YES | a ↔ 1 |
| 15.5 | b ↔ II | --- | --- | --- |
| 19.0 | --- | a ↔ 2 | --- | --- |
| 20.0 | --- | b ↔ 1 | --- | --- |
| 20.5 | --- | --- | YES | { a ↔ 2, b ↔ 1 } |
| 25.5 | c ↔ III | --- | --- | --- |
| 28.0 | --- | a ↔ 3 | --- | --- |
| 29.0 | --- | b ↔ 2 | --- | --- |
| 30.0 | --- | c ↔ 1 | --- | --- |
| 30.5 | --- | --- | YES | { a ↔ 3, b ↔ 2, c ↔ 1 } |
| 35.5 | d ↔ IV | --- | --- | --- |
| 37.0 | --- | a ↔ 4 | --- | --- |
| 38.0 | --- | b ↔ 3 | --- | --- |
| 39.0 | --- | c ↔ 2 | --- | --- |
| 40.0 | --- | d ↔ 1 | --- | --- |
| 40.5 | --- | --- | YES | { a ↔ 4, b ↔ 3, c ↔ 2, d ↔ 1 } |
| 45.5 | e ↔ V | --- | --- | --- |
| 46.0 | --- | a ↔ 5 | --- | --- |
| 47.0 | --- | b ↔ 4 | --- | --- |
| 48.0 | --- | (c ↔ 3) | --- | --- |
| 49.0 | --- | d ↔ 2 | --- | --- |
| 50.0 | --- | e ↔ 1 | --- | --- |
| 50.5 | --- | --- | YES | { a ↔ 5, b ↔ 4, (c ↔ 3), d ↔ 2, e ↔ 1 } |
| 55.0 | --- | a ↔ 6 | --- | --- |
| 55.5 | f ↔ VI | --- | --- | --- |
| 56.0 | --- | b ↔ 5 | --- | --- |
| 57.0 | --- | c ↔ 4 | --- | --- |
| 58.0 | --- | d ↔ 3 | --- | --- |
| 59.0 | --- | (e ↔ 2) | --- | --- |
| 60.0 | --- | (f ↔ 1) | --- | --- |
| 60.5 | --- | --- | YES | { a ↔ 6, b ↔ 5, c ↔ 4, d ↔ 3, (e ↔ 2), (f ↔ 1) } |

FIG. 8

| LINE | PATTERN | COINCIDENCE TIME | RESET TIME | ACTUATED HAMMER |
|---|---|---|---|---|
| a | 7 | 64.0 | 70.5 | $H_G$ |
| b | 0 | 101.0 | 110.5 | $H_J$ |
| c | 3 | 48.0 | 50.5 | $H_C$ |
| d | 6 | 85.0 | 90.5 | $H_F$ |
| e | 2 | 59.0 | 60.5 | $H_B$ |
| f | 1 | 60.0 | 60.5 | $H_A$ |
| g | 5 | 106.0 | 110.5 | $H_E$ |
| h | 0 | 161.0 | 170.5 | $H_J$ |
| i | 8 | 153.0 | 160.5 | $H_H$ |
| j | 2 | 109.0 | 110.5 | $H_B$ |
| k | 0 | 191.0 | 200.5 | $H_J$ |
| l | 1 | 120.0 | 120.5 | $H_A$ |
| m | 1 | 130.0 | 130.5 | $H_A$ |
| n | 7 | 194.0 | 200.5 | $H_G$ |
| o | 9 | 222.0 | 230.5 | $H_I$ |
| p | 5 | 196.0 | 200.5 | $H_E$ |
| q | 5 | 206.0 | 210.5 | $H_E$ |
| r | 3 | 198.0 | 200.5 | $H_C$ |
| s | 6 | 235.0 | 240.5 | $H_F$ |
| t | 4 | 227.0 | 230.5 | $H_D$ |

FIG. 9

United States Patent Office 3,077,158
Patented Feb. 12, 1963

3,077,158
PRINTING DEVICE
Walter Hoffmann, Rueschlikon, Zurich, Switzerland, assignor to International Business Machines Corporation, New York, N.Y., a corporation of New York
Filed Dec. 2, 1960, Ser. No. 73,388
10 Claims. (Cl. 101—93)

This invention relates to record-controlled printing apparatus, and more particularly to printing apparatus of the multiline type wherein the record-receiving web is fed continuously past a matrix of individually actuatable image producing members which are selectively energized in timed relationship to the passage of the web so as to record thereon the desired pattern of data images.

This invention constitutes an improvement over that disclosed and claimed in my co-pending application Serial No. 855,452, filed November 25, 1959, the improvement thereover residing principally in the data storage apparatus and control circuits for timing the selective actuation of the image producing elements under the control of the coded input data.

The prior application relates to a multiline printer in which printing takes place simultaneously on a plurality of lines; only a certain number of the totality of the characters to be printed, however, are printed on these lines at given consecutive moments. A record carrier to receive the information to be printed is provided, as well as an arrangement of print characters, for example in the form of printing types, which comprise a given number of different symbols. The print characters are disposed in sets, each set containing one of each of said different symbols. Moreover, there is provided a driving means to continuously move the record medium with respect to and across a two-dimensional print character screen which comprises at least a part of the print characters of said arrangement. Care is taken that a plurality of print lines of the record carrier simultaneously are located opposite to the print characters of the screen of print characters, the symbol sets of the print character screen being arranged in such a manner that one to each printing position on the record carrier during the passage along the print character screen, each of the different print character symbols is offered at least once for printing. Actuating means for printing are provided for co-operating with the pirnt characters of the print character screen, which means enable selective printing of the print characters. Furthermore, in the printing device according to the main patent a storage arrangement is provided, in which the information to be printed or at least a part thereof is stored. A plurality of the stored information lines having coded reference symbols, which are related to the print character symbols, are simultaneously compared in associated coincidence units. If coincidence occurs, that means if identity prevails between a stored information character and a reference symbol, the respective print actuating means is activated, which then effects the printing upon the record medium.

According to the present invention only one line of the stored information is compared with the coded reference symbols, and a temporary storage means is provided, which stores the marking pulses occurring at coincidence until the simultaneous printing of several lines occurs on this record carrier. The number of the required coincidence units and of the selecting devices necessary for the information storage means, can be considerably reduced by the consecutive line by line comparison of the stored information with the reference symbols.

A magnetic storage drum is preferably used as information storage means in this kind of multiline printer, the speed of said drum being in a given ratio to the travelling speed of the record medium. With respect to the printing device shown in the main patent the present invention offers in addition the advantageous possibility to substantially increase the rotary speed of the magnetic storage drum relatively to the moving speed of the record medium. By this means it becomes possible to provide conventional drum speeds, for example between 3000 and 15,000 r.p.m.

Accordingly it is an object of this invention to provide an improved control apparatus for a multi-line printer wherein the record-receiving web is moved in constant relative motion with respect to the data image producing members which are selectively actuated in timed sequence to impress the desired data in predetermined areas on the moving web.

A further object is to provide an improved control apparatus for a printer of the hereinabove defined type wherein codal representations of the data to be printed are recorded on a moving storage medium, successively compared with the codal representations of all the characters in the printing fort in timed sequence with the passage of the web past the fort, the comparison stored in a matrix memory, and the matrix memory read out to actuate the individual respective image producing members.

Another object is to provide a printer control apparatus wherein the codal data is stored on a moving record storage medium whose movement is so timed with respect to the emission of codal representations of the characters of the fort that each codal data record is successively compared with each different codal character representation.

The foregoing and other objects, features and advantages of the invention will be apparent from the following more particular description of preferred embodiments of the invention, as illustrated in the accompanying drawings.

Figure 1A:
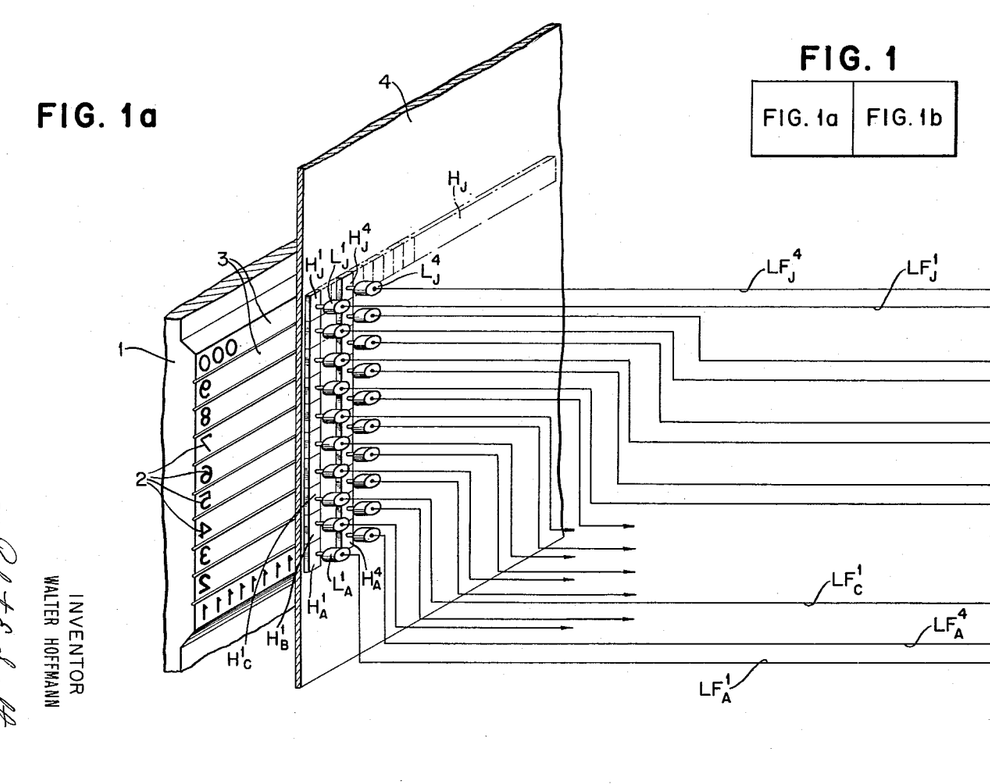
FIGS. 1a and 1b show a diagrammatic view of an example of a multi-line printing device.

FIG. 1a shows a printing device with a fixed print platen 1. The characters to be printed are formed on the surface of this platen 1 as raised print types 2. The print platen 1 has as many lines 3 of print types as different symbols are provided for the printing operation. Each line 3 contains print types of the same symbol only.

For the sake of simplicity, ten different print character symbols only, namely the numerals 0 through 9, are provided in the disclosed printing device. The invention, however, is not limited to this specific case. It would be obvious to a person skilled in the art to design printing devices having any desired number of print character symbols, for example alphanumerical multi-line printers.

In FIG. 1a, opposite to the print types 2 of the platen 1, a plurality of individually movable hammers H are provided, which co-operate with the associated print types in order to effect a printing action. The print hammers H are combined in ten line sets which are indexed A to J for the purpose of differentiation. In each of the ten hammer sets $H_A$ to $H_J$ as many individually movable hammers are provided as there are printing positions in one print line. Generally, this number will be designated by $\nu$ and the individual hammer consequently marked $H_A^1$ to $H_A^\nu$, $H_B^1$ to $H_B^\nu$ and so one until $H_J^1$ to $H_J^\nu$. Thus, ten times $\nu$ single print hammers are altogether provided.

Actuating members L (for example solenoids or the like) belong to each of these hammers H. For the purpose of designation, they are provided with index numbers in the same way as the hammers. Each of these actuating members L is connected by means of a selecting wire LF to a ferrite core of the temporary storage matrix to be seen in FIG. 1b.

The record carrier 4, which is continuously moved upwards is placed between the print platen 1 and the hammers H. A color ribbon not shown in FIG. 1a may be provided between the print types and the record carrier.

Figure 1B:
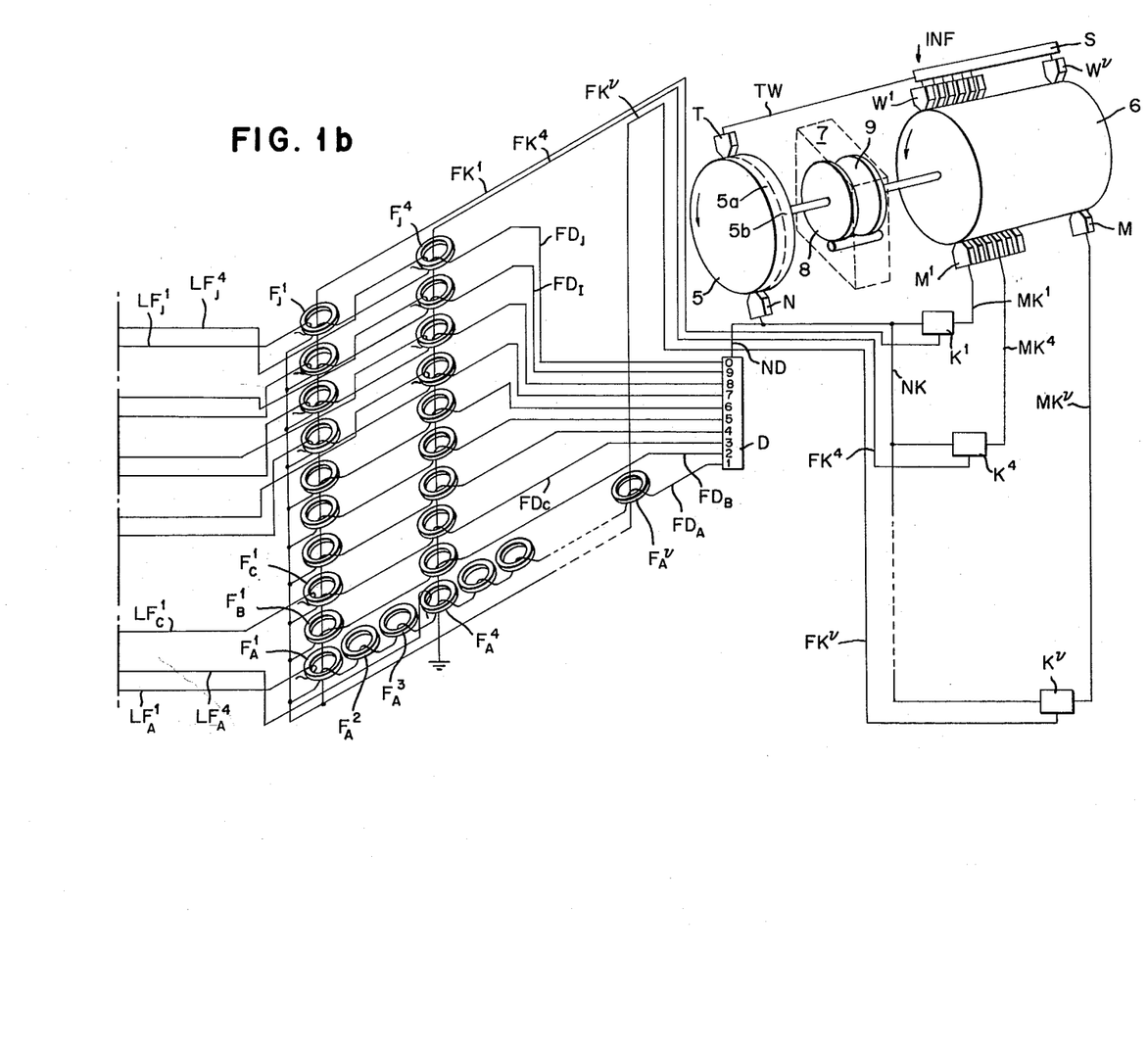

The upper part of the right hand side of FIG. 1b represents a schematic view of two magnetic drums 5 and 6, which both rotate counterclockwise but not with the same speed. They are connected together by means of a transmission gearing 7 which provides a given speed relation between both drums. In the example here disclosed showing ten different print symbols, the speed ratio of the two drums is selected in such a manner that drum 6 makes ten revolutions during nine revolutions of drum 5. In FIGURE 1b the ratio of the gearing 7 is indicated by the 10:9 ratio of the diameters of the gear wheels 8 and 9. The magnetic drums are continuously driven by a motor not shown in FIG. 1b.

The coded information to be printed, is fed serially digit by digit into a storage register S (FIG. 1b) of common type. In this register the digits are shifted from left to right. By means of a gating pulse which enters the storage register S through a wire TW, the information stored in the register S is transferred in parallel to a plurality of magnetic writing heads W, which write the coded information in one line on the magnetic surface of the drum 6.

Diametrically opposite to the writing heads W a set of magnetic reading heads M is provided, which read the information lines stored on the magnetic drum 6. There are as many writing heads W and reading heads M arranged in one line, as printing positions provided in one line. Generally, this number is marked $\nu$ and therefore the individual writing and reading heads are marked $W^1$ to $W^\nu$ and $M^1$ to $M^\nu$, respectively.

Around the periphery of the magnetic drum 6, nine line positions are provided for storing the information; they are marked I to IX, as will be explained, later.

The magnetic drum 5 comprises two tracks 5a and 5b. The magnetic head N relates to the track 5a, while the magnetic head T, which is diametrically opposite to the magnetic head N, relates to track 5b. The ten coded print symbols, that means the numerals 0 to 9, are magnetically recorded on the track 5a. This track 5a also contains a reset symbol $R_N$ which will be explained later. The track 5b serves for timing purposes. Generally, the coded characters on the magnetic drum 5 will be called reference symbols and the drum 5 reference drum.

The magnetic heads $M^1$ to $M^\nu$ are connected by means of wires MK to the first inputs of associated coincidence units $K^1$ to $K^\nu$, the functioning of which will be explained later with reference to FIG. 4. The second inputs of these coincidence units are connected through wires NK to the magnetic reading head N, which reads the coded reference symbols of drum track 5a. The outputs of the coincidence units $K^1$ to $K^\nu$ are connected by means of wires $FK^1$ to $FK^\nu$ to associated vertical columns of ferrite cores F of a storage matrix.

The coded reference symbols read by the magnetic head N are also fed to a decoding unit D by means of a wire ND. Pulses occurring on the ten different output terminals FD of this decoding unit correspond to the ten digits-reference symbols provided. These terminals $FD_A$ to $FD_J$ are connected with the related horizontal lines of the ferrite cores F of the storage matrix. The decoding unit D also serves for resetting the ferrite cores F to a defined condition of magnetic remanence, as will be described later.

As explained previously, the ferrite core storage matrix comprises $\nu$ columns and ten lines of ferrite cores F which are wired in conventional matrix form by means of $\nu$ vertical column wires FK and ten horizontal line words FD. When the reset condition of the ferrite cores is designated as the condition 0 and the switched-over condition as the condition 1, single ferrite cores are switched over from the condition 0 to the condition 1 according to the known coincident current principle. In this case, a current pulse is passed through a selected line wire and another current pulse through a selected column wire, in such a way, that the magnetic field produced in the selected core by these pulses is sufficient to switch the core, whereas a magnetic field of half this value is not sufficient. Resetting of the cores from state 1 to state 0 is simultaneously effected in all cores by passing current pulses of sufficient energy and opposite polarity through all horizontal line wires $FD_A$ to $FD_J$. These reset pulses which simultaneously occur on all ten horizontal line words are also generated in the decoding unit D, as will be explained later with reference to FIG. 5.

Each of the cores F of the storage matrix carries an output winding which is connected through wires LF to related actuating members L (see FIG. 1a). The actuating members L operating the hammers H are sensitive only to output pulses in the wires LF, which occur during resetting the cores F from state 1 to state 0. Switching single cores from state 0 to state 1 does not cause a hammer activation. This can be achieved for instance by means of diodes inserted into the wires LF, which are not shown in FIGS. 1a and 1b. It is obvious that the switch pulses occurring in the wires LF, during the resetting of the cores from state 1 to state 0, are of opposite polarity with respect to switch pulses which occur when cores are switched from state 0 to state 1.

Figure 2A:
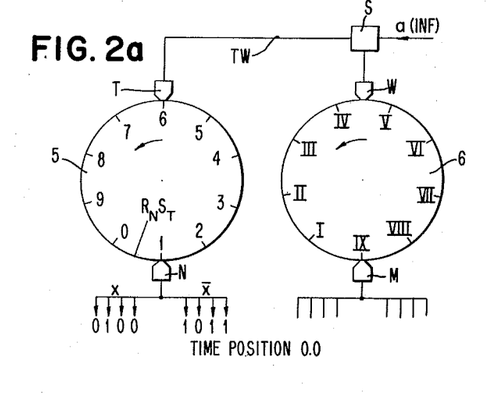
FIGS. 2a to 2d show positions of the drum of the reference symbols and of the information storage drum with their peripheral markings at four distinct time positions.

Reference is now made to FIG. 2a which shows the distribution of the coded reference symbols and the line positions for the information storage around the periphery of the reference drum 5 and the information drum 6, respectively, at a distinct time position. The reference symbols 0 to 9 are equidistantly spaced around the periphery of the reference drum 5. In addition to these ten reference symbols a reset symbol $R_N$ and a gating marking $S_T$ are provided, which are situated between the reference symbols 0 and 1. The reference symbols 0 to 9 and the reset symbol $R_N$ belong to the reference drum track 5a and the magnetic reading head N, whereas the gating markings $S_T$ belong to the reference drum track 5b and the magnetic reading head T.

Figure 2B:
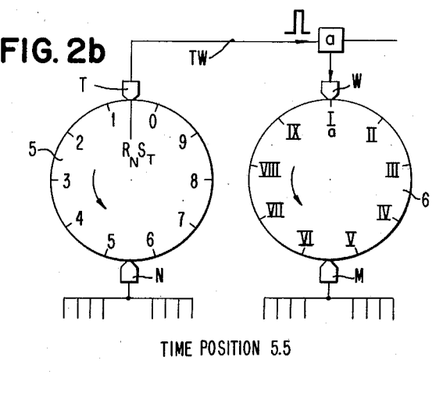
Figure 2C:
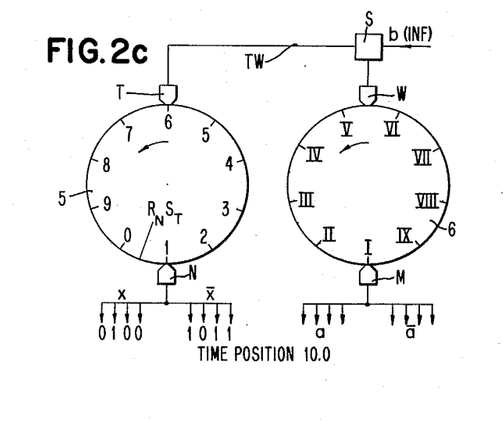
Figure 2D:
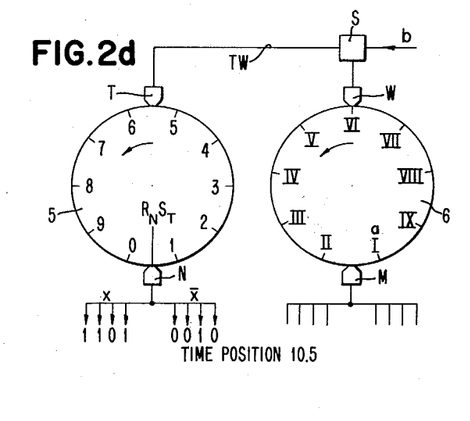

On the surface of the information drum 6, nine line positions marked I to IX are provided for the storage of nine information lines. They are equidistantly spaced around the periphery of the information drum 6. The information to be printed is written line by line, which lines are marked a, b, c, etc., on these line positions. FIG. 2b shows the writing of the information line a stored in the register S onto the line position I of information drum 6.

Figure 3:
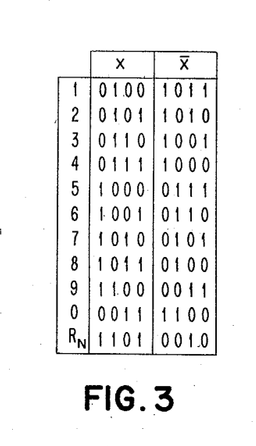
FIG. 3 shows the excess-three-code and its complement which is proposed for coding the data (numerals) to be printed.

Reference will again be made to FIGS. 2a to 2d when the operation of the entire printing device is described. Further details of these figures will then be explained. Reference is now made to FIG. 3 which shows a binary code of the reference symbols 0 to 9, the reset symbol $R_N$ and the information to be printed. As an example the excess-three-code has been chosen for representing the symbols generally designated with X. All information characters to be printed and the reference symbols should also be available in the form of their complements $\bar{x}$. This can be achieved by recording both the characters $x$ and also their complements $\bar{x}$ on the drum or by generating the corresponding binary complements in the electronic magnetic head circuits. The individual bits of the characters $x$ and their complements $\bar{x}$ should be recorded in parallel. Thus, the connecting wires MK and NK are composed of a plurality of individual channels for each bit. The present example provides eight parallel channels, namely four for the character $x$ and four for the complementary character $\bar{x}$.

Figure 4:
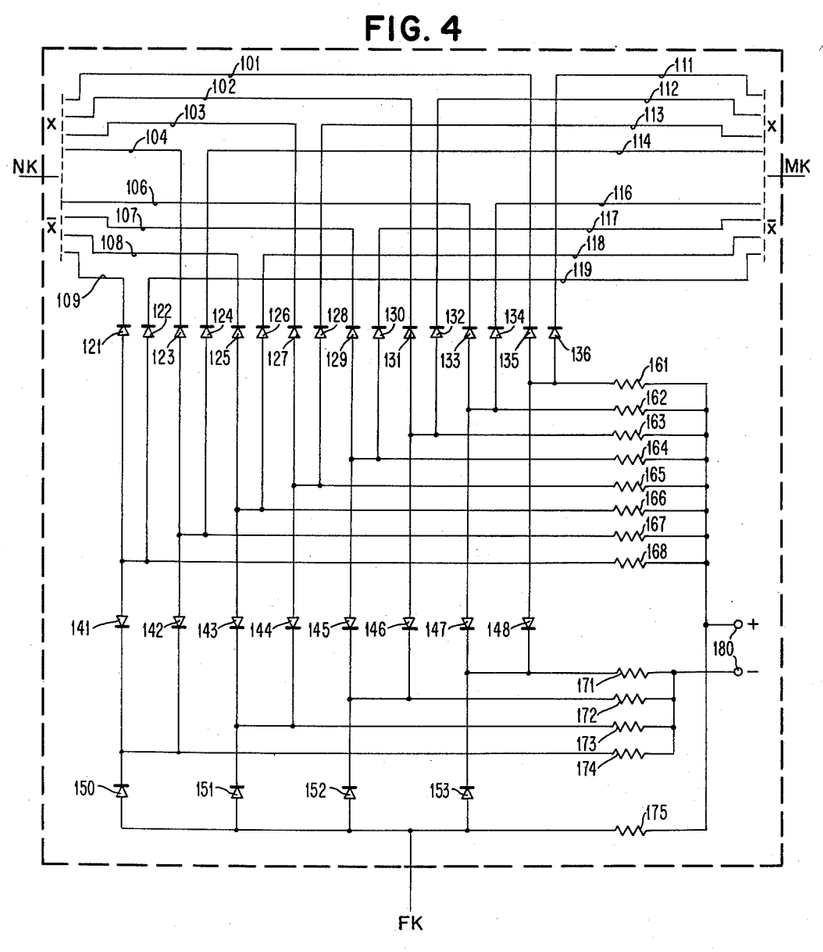
FIG. 4 is the wiring diagram of the coincidence units, conventional diode AND-OR-AND circuits being used.

FIG. 4 shows the wiring diagram of a coincidence unit K.

The coincidence unit is shown within dash lines. It has an input NK which leads from the reading head N to the wires 101—104, 106—109, and an input MK which leads from one of the reading heads M to the input wires 111—114, 116—119. The wire 101 is connected to the rectifier 135, the wire 102 to the rectifier 131 and so on, and the wire 119 is connected to the rectifier 122, as shown in FIG. 4. The direction of low current resistance of rectifiers 121—136 is the flow direction to the wires 101 to 104 and 106 to 109, 111 to 114 and 116 to 119. The rectifiers 121 to 136 are connected with the resistors 161 to 168 as follows: rectifiers 121 and 122 with resistor 168, rectifiers 123 and 124 with resistor 167 and so on and rectifiers 135 and 136 with resistor 161, as indicated in FIG. 4. The connection between rectifiers 121, 122 and resistor 168 also communicates with rectifier 141, the connection of the rectifiers 123, 124 with the resistor 167 also communicates with rectifier 142 and so on, and the connection of the rectifiers 135 and 136 with the resistor 161 also communicates with rectifier 148, as shown in FIG. 4. The other ends of the resistors 161—168 are all connected to the positive terminal of a voltage source 180. The negative poles of the rectifiers 141 and 142 are connected to one side of the resistor 174, the negative terminals of the rectifiers 143, 144 are connected to one end of the resistor 173, the negative terminals of the rectifiers 145 and 146 are connected to one side of the resistor 172 and the negative terminals of the rectifiers 147 and 148 are connected to one side of the resistor 171. The other ends of the resistors 171—174 are connected to the negative pole of the mentioned voltage source 180. In communication with the negative terminal of the rectifiers 150, 151, 152, 153 are the connection of the rectifiers 141, 142 with the resistor 174, the connection of the rectifiers 143, 144 with the resistor 173, the connection of the rectifiers 145, 146 with the resistor 172, and the connection of the rectifiers 147, 148 with the resistor 171, the positive poles of the rectifiers 150—153 being connected to the column wire FK and through the resistor 175 to the positive pole of the mentioned voltage source 180. The column wire FK is connected to one of the vertical columns of the ferrite cores F of the storage matrix. Each one of the resistors 161—168 is smaller than any one of the resistors 171—174.

In the operation of the coincidence unit according to FIG. 4 the input wires 101—104, 106—109, 111—114 and 116—119 are normally kept e.g. at −10 volts. Input signals are assumed to be represented by signals which raise the voltage of the respective input wire to +10 volts. The +terminal of the voltage source 180 is assumed to be +20 volts and the −terminal thereof is assumed to be −20 volts. It is further assumed that the signals supplied to the input wires NK and MK and to the coincidence unit are represented in a binary code. It shall now be assumed that the number 4 in binary form 0100 is fed to the upper input lines 101 to 104 and 111 to 114, in other words that a coincidence occurs. Furthermore, the arrangement is assumed to be such that the complement of the binary number, which in this case is 1011, is simultaneously supplied to the wires 106—109 and to the wires 116—119. When a "0" on a wire is represented by the voltage −10 volts and a "1" on a wire by +10 volts, the introduction of the number "4" represented by 0100 and its complemented 1011 into the inputs NK and MK produces the following condition:

Wire 101—10 v.      Wire 111—10 v.
Wire 102+10 v.      Wire 112+10 v.
Wire 103—10 v.      Wire 113—10 v.
Wire 104—10 v.      Wire 114—10 v.
Wire 106+10 v.      Wire 116+10 v.
Wire 107—10 v.      Wire 117—10 v.
Wire 108+10 v.      Wire 118+10 v.
Wire 109+10 v.      Wire 119+10 v.

The rectifiers 121—136 are poled in such a way that the −10 volt biases pass easily, so that the positive poles of the rectifiers 142, 144, 145 and 148 assume the −10 volt potential. The positive poles (upper poles in FIG. 4) of the rectifiers 141, 143, 146 and 147, however, are of a more positive potential, applied by the current flow from the +pole of the voltage source 180 through the respective resistors 161—168, the respective diodes 141—148 and through the respective resistors 171—174 back to the −pole of the source 180. The rectifiers 141, 143, 146 and 147 pass this more positive potential on to the negative poles of rectifiers 150—153 so that the current from the +terminal of the voltage source 180 through the resistor 175 decreases, causing an output pulse to appear on the column wire FK when coincidence prevails in all of the bit channels.

In order to appreciate the conditions when no coincidence exists, it may be assumed that the wire 104 is +10 volts, while wire 114 still is −10 volts. Then wire 109 is −10 volts and wire 119 still is +10 volts. This means that the positive pole of the diode 141 becomes −10 volts; these −10 volts pass unhindered through diode 150 and keep the column wire FK at the negative potential, so that a positive output pulse is prevented from appearing at this point.

Diode switching circuits of this type are well known in the art and described for instance in the book of R. K. Richards, "Digital Computer Components and Circuits," in chapter 2 "Diode Switching Circuits." These coincidence circuits are not the subject of the present invention. Any other type of coincidence circuits may be used.

Figure 5:
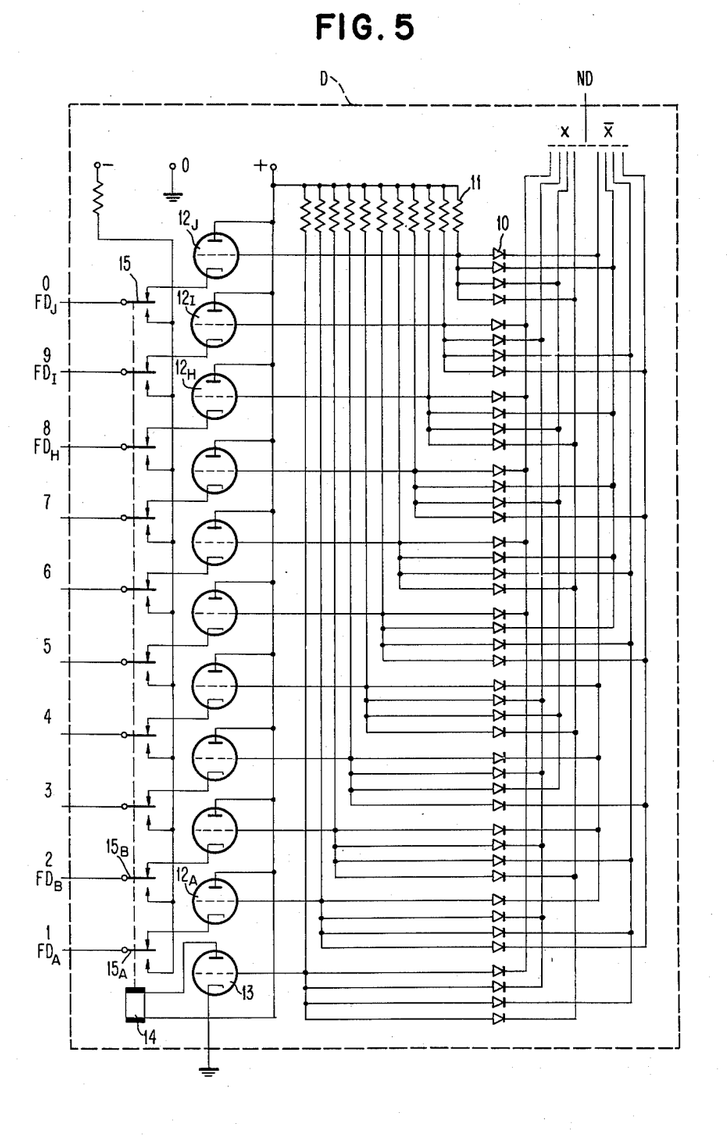
FIG. 5 is the wiring diagram of the decoding unit, conventional diode AND circuits being used.

FIG. 5 shows the wiring diagram of the decoding unit and the reset pulse-generator. Conventional "AND" diode circuits are used, which comprise a plurality of diodes 10 and resistors 11. Decoding "AND" circuits of this type are well known in the art. They are not subject of the present invention and any other type of decoding circuits may be used. The wiring diagram is related to the code shown in FIG. 3. When a pulse combination, which represents a coded reference symbol according to FIG. 3, is transferred to the channels of the input word ND, a pulse occurs at the output of the respective "AND" diode circuit. This pulse passes to the related control grid of tube 12 and causes this tube to carry a current. This current passes from the plus terminal (+) through the tube 12, a closed switch 15, over a related wire FD, through a horizontal line of ferrite cores F of the storage matrix to the grounded zero potential (see also FIG. 1b). When the reset symbol R is transferred to the channels of the input wire ND, a pulse occurs at the control grid of tube 13. By the current flow thus caused in the anode circuit of tube 13 a relay 14 is energized which simultaneously reverses all switches 15. In this manner ten parallel circuits are closed from the minus terminal (−) through the wires $FD_A$ to $FD_J$ which are passed through all ferrite cores F of the storage matrix, to the grounded zero potential. It is obvious that the current in the latter case passes the wires FD in opposite direction as compared with the current passing through the wires FD when a tube 12 is current conducting as previously described.

The current energy passing from the minus terminal (—) through switch 15 and wires FD to zero potential, must be sufficient to cause all cores F of the storage matrix which are in state 1 to be reset to state 0.

The electrical characteristics of the tubes 12 and the level of the positive voltage applied to the plus terminal (+) must be chosen in such a manner that the current, which flows from the plus terminal (+) through the selected tube 12, a switch, and the related wire FD, through a horizontal line of ferrite cores F of the storage matrix to the grounded zero potential, is just one half of the value of the current required to switch the related ferrite cores F from state 0 to state 1. It has already been mentioned that switching from state 0 to state 1 is effected according to the coincident current principle.

Figure 6:
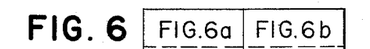
FIG. 6 shows the graphic timing diagram for the drum of the reference symbols.
Figure 6A:
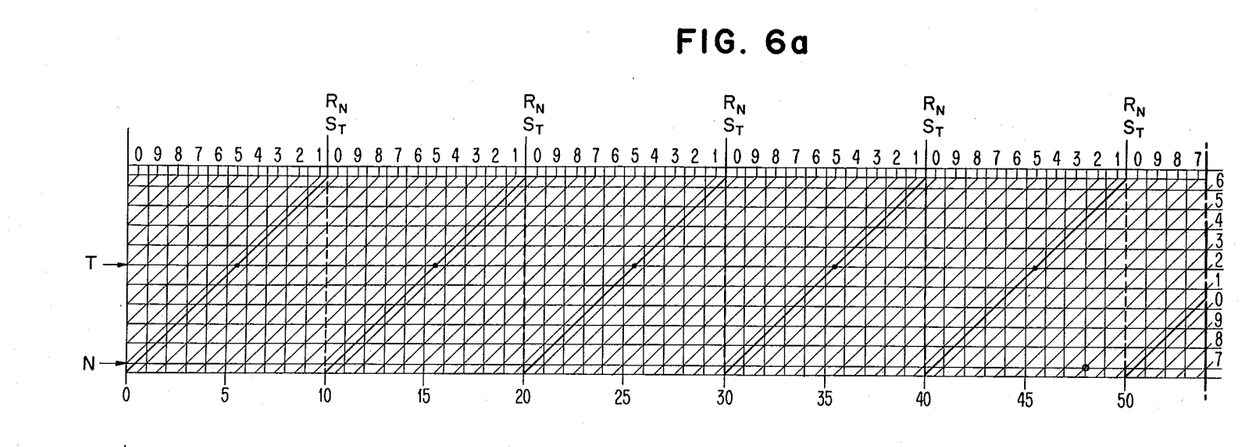
Figure 6B:
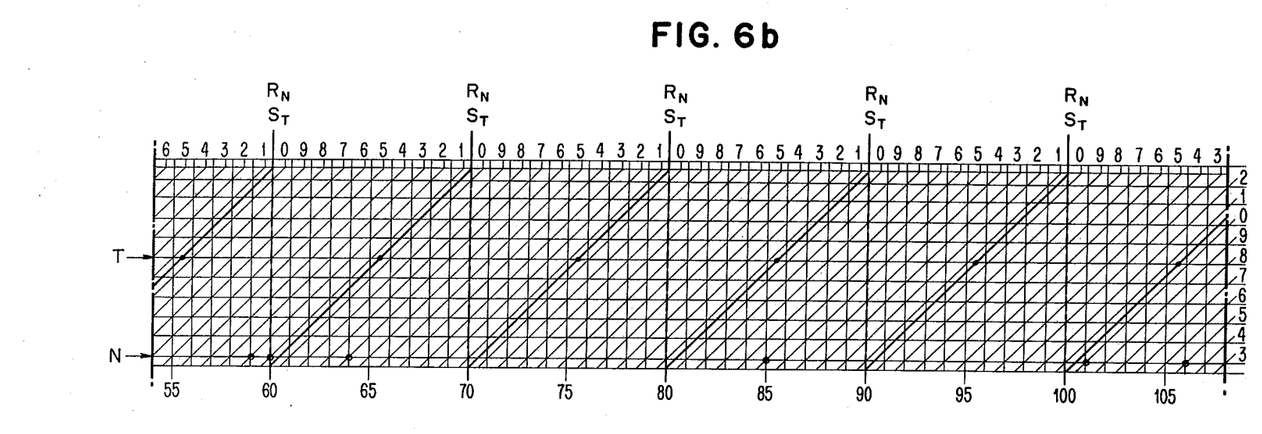
Figure 7:
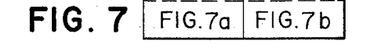
FIG. 7 shows the graphic timing diagram for the information storage drum.
Figure 7A:
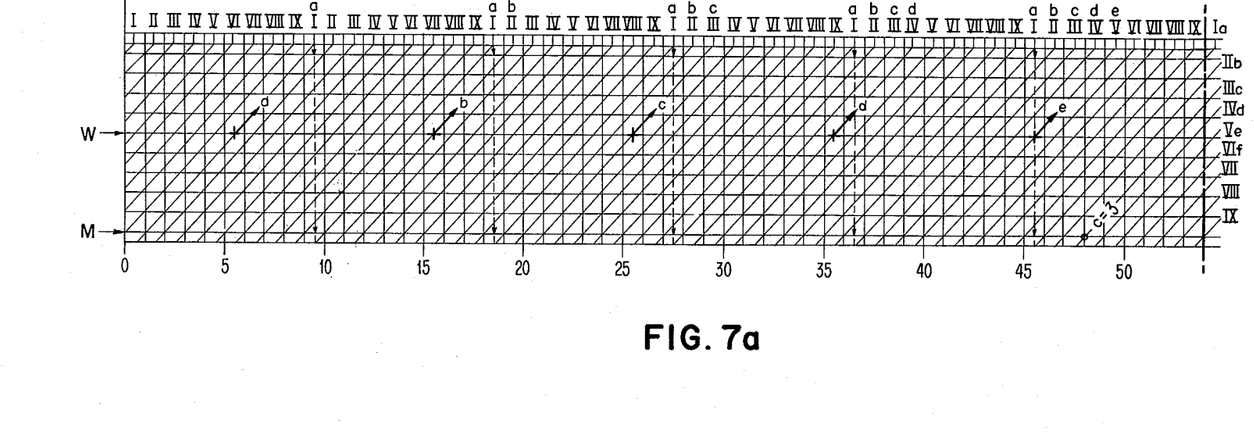
Figure 7B:
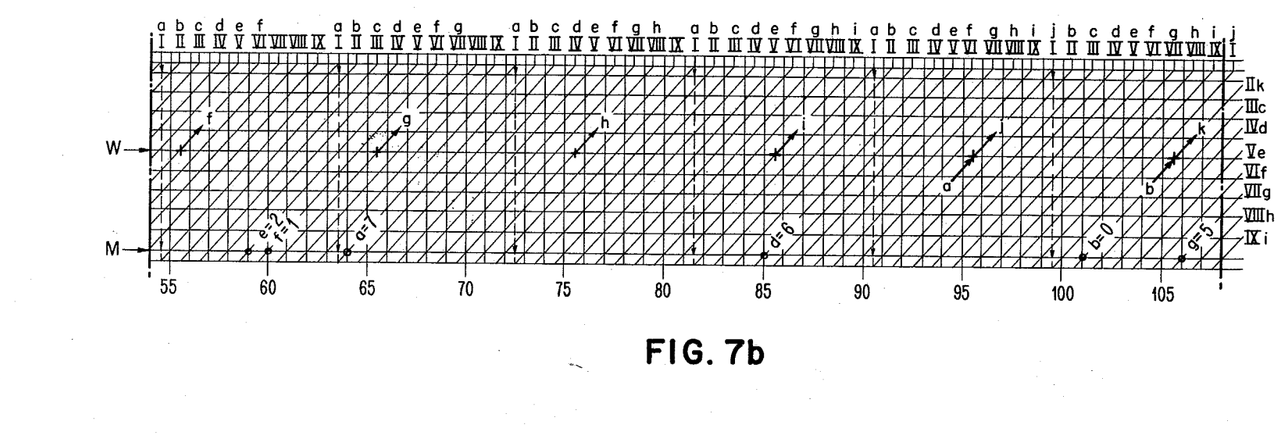

Reference is now made to the graphical timing diagrams FIGS. 6 and 7 which illustrate the time sequence operation of the reference drum 5 (FIG. 6) and of the information drum 6 (FIG. 7). In both figures the abscissa represents the time and the ordinate represents the angular positions of the periphery of the respective drums. The location of the magnetic heads T, N, W and M is indicated.

The thin diagonal lines of FIG. 6 represent the ten reference symbols 0 to 9 which are read by the magnetic head N. The thick diagonal lines of FIG. 6 represent the reset symbol $R_N$ and as well the gating marking $S_T$. As stated previously, $R_N$ belongs to the drum track $5a$ and this will be read by the magnetic head N, whereas $S_T$ is part of the drum track $5b$ and read by the magnetic head T (see FIG. 1$b$).

The diagonal lines of FIG. 7 represent the nine line positions I through IX of the information drum 6. Information lines written in these positions are designated by $a$, $b$, $c$, $d$, etc. Always when the gating marking $S_T$ passes the magnetic head T (which is indicated by a dot in FIG. 6), writing of a new information line is effected by the magnetic writing heads W. Writing of a new information line is indicated in FIG. 7 by an arrow marked with a cross. By writing the new information, the old information is automatically deleted in this line position. The circular markings in the horizontal lines, which relate to the magnetic heads N and M (see FIGS. 6 and 7, respectively), indicate the presence of coincidence according to a proposed pattern, as will be explained later.

The operation of the entire printing system shall now be explained. In order to illustrate the mode of operation, some definition shall first be given.

The time interval during which the reference drum 5 makes one full revolution is divided into ten time units, as shown in FIG. 6. It will always take one time unit to cause consecutive reference symbols of the drum 5 to pass the reading head N.

As mentioned above, the information drum 6 rotates one tenth faster than the reference drum 5. Thus, one revolution of the information drum 6 corresponds to nine time units. Due to the presence of nine line positions (I to IX) around its periphery, it requires one time unit for successive information lines of the drum 6 to pass the reading heads M. In this manner, always after nine time units, each of the information lines of the drum 6 will be compared in consecutive order with the next following reference symbol. It requires 90 time units to compare a single information line with all ten reference symbols.

During ten time units a printing line of the record medium, which is continuously moved upwards, will always reach the next printing position. The interconnection of the driving means of the record medium with the driving means of the magnetic drums is determined by this timing ratio.

It is to be noted that FIGS. 6 and 7 only show 108 time units. It seems to be obvious in which manner the timing diagram can be extended for the following time units, if necessary.

The mode of operation of the present printing device can be best understood by way of an example. It is assumed that at the beginning of the printing operation (time unit 0) the arrangement of the multiline printer is in a position illustrated in FIG. 2$a$. The reference symbol 1 is opposite the magnetic head N; the line position IX opposite the magnetic heads M. At time position 0 the information drum 6 bears no information; all line positions I to IX are empty. The first printing line $a$ of the record medium is one line below the first printing position, characterized by the print hammers $H_A$. The first line of the information to be printed (marked INF in FIG. 2$a$) is just entering the storage register S.

Figure 8:
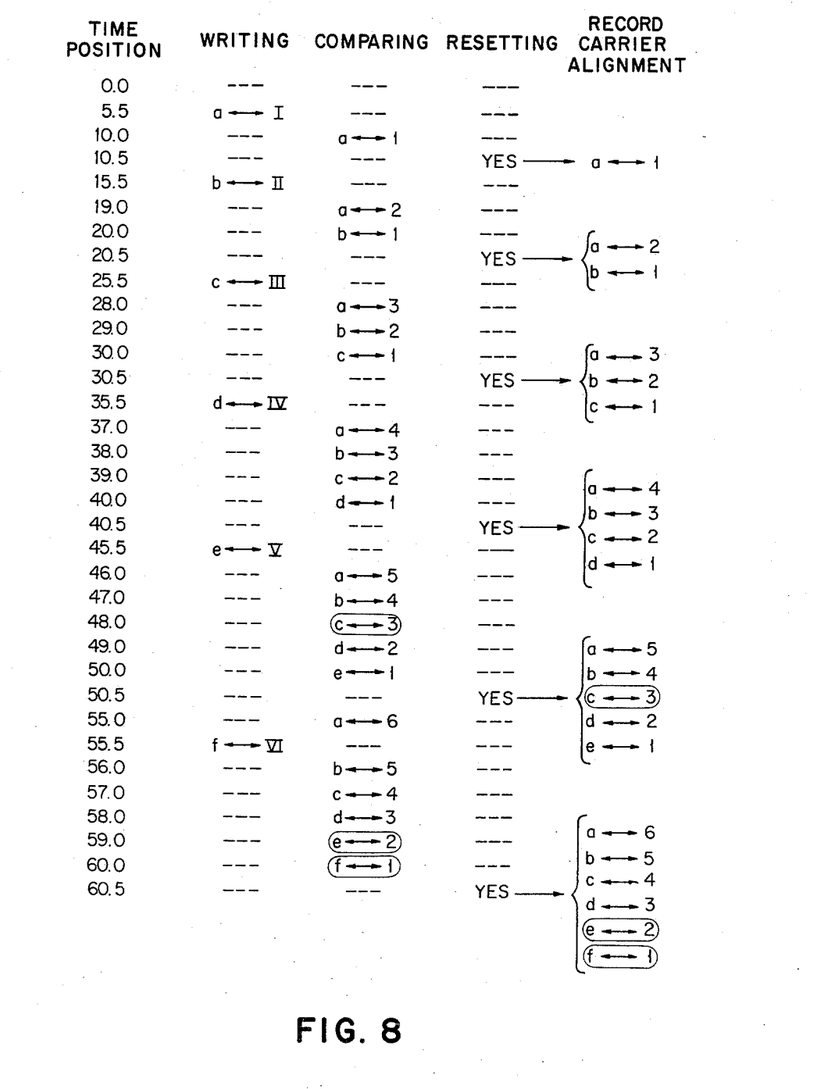
FIGS. 8 and 9 are operation analyzing tables.

Reference is now made to FIG. 8 which shows in tabular form which operations will take place at predetermined time units. There will first be given some explanations. "Writing $a \leftrightarrow$ I" means that the information line $a$ is written into line position I by means of writing heads W.

"Comparing $a \leftrightarrow 1$" means that the information line $a$ (which is just passing the reading head M) is compared with the reference symbol 1 (which is just passing the reading head N), and that in case of coincidence the respective cores $F_A$ (the index A corresponds to the reference symbol 1) are switched from state 0 to state 1.

"Resetting" means that all cores F of the storage matrix are switched back from state 1 to state 0. The reset pulses thereby obtained in the wires LF cause the associated print hammers to be actuated.

"Position of the record carrier $a \leftrightarrow 1$" means that the printing line $a$ of the record carrier is opposite the print type 1.

The positions of the magnetic drums 5 and 6 for the time positions 0.0; 5.5; 10.0 and 10.5 are shown in FIGS. 2$a$ to 2$d$.

In an example it shall now be assumed that the following sequence of numbers shall be printed. For sake of simplicity, only one column to be printed (having index 1) will be discussed.

Line:           $a\ b\ c\ d\ e\ f\ g\ h\ i\ j\ k\ l\ m\ n\ o\ p\ q\ r\ s\ t$
Number sequence: 7 0 3 6 2 1 5 0 8 2 0 1 1 7 9 5 5 3 6 4

Figure 9:
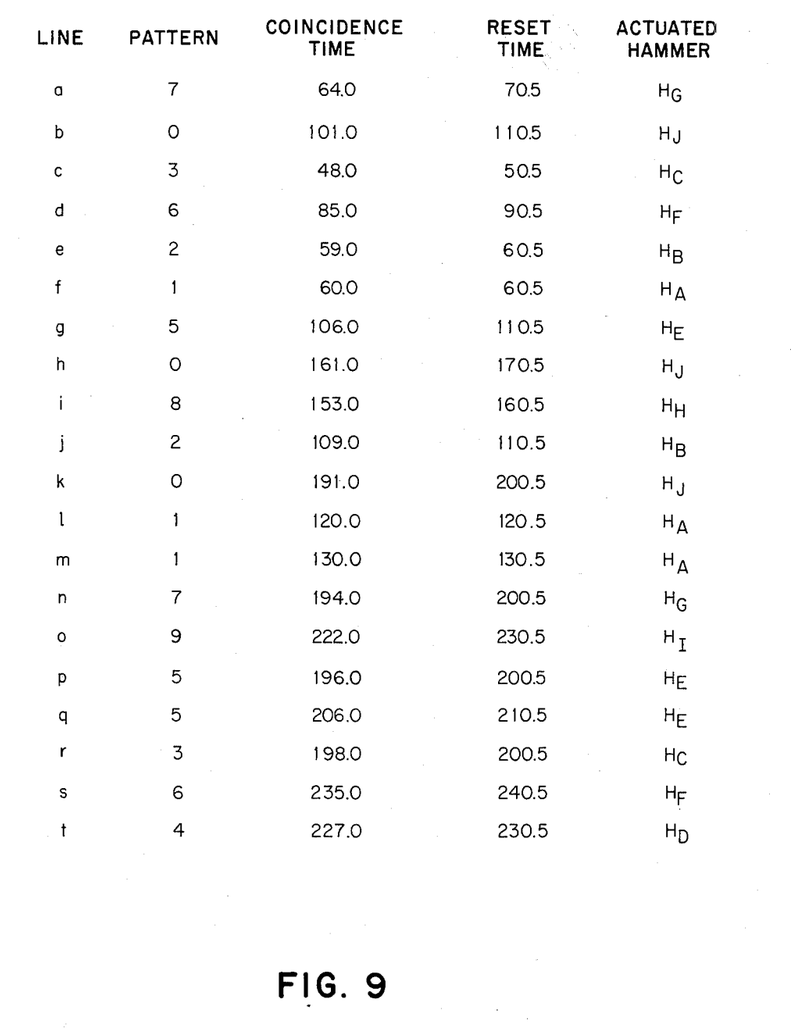

Reference is now made to FIG. 9, which shows in tabular form, at which time positions coincidence occurs between individual numbers of the number sequence to be printed and the corresponding reference symbols, and at which time positions the resetting of eventually switched ferrite cores of the storage matrix takes place, and which hammers will then be actuated.

The presence of coincidence according to the proposed number sequence is also marked in FIGS. 6, 7 and 8.

It will now be analyzed at which time position a coincidence will occur for the first time. This is the case at time position 48.0. At this time position the line position III, which carries the information line $c$ with the number 3, is compared with the reference symbol 3. The occurring coincidence causes the appearance of a pulse at the output of the coincidence unit $K^1$. The current pulse which is sent through the wire $FK^1$ passes through all ferrite cores $F_A{}^1$ to $F_J{}^1$ of the storage matrix, arranged in a vertical column. It tends to switch these cores from state 0 to state 1, however, this pulse itself is not sufficient to accomplish complete switching. At the same time position 48.0, the coded reference symbol 3 is supplied to the decoding unit D. A pulse now occurs in the wire $FD_C$ related to the reference symbol 3. This current pulse passes through all ferrite cores $F_C{}^1$ to $F_C{}^v$ of the storage matrix, arranged in a horizontal line. It tends to switch these cores from state 0 to state 1, but it is not sufficient in itself to accomplish a complete switching. In accordance with the coincident current principle, only the core $F_C^1$ is switched, since both current pulses are here superimposed and thus cause a complete switching of the ferrite core $F_C^1$ from state 0 to state 1. It has previously been stated that for this switching direction the output pulse then induced in the winding $LF_C^1$ does not actuate the respective hammer $H_C^1$.

It shall now be considered the time position 50.5 at which the resetting of the ferrite core $F_C^1$ from state 1 to state 0 takes place. At this time position the record medium is aligned as follows: print line $a$ is opposite to the print types 5, print line $b$ is opposite to print types 4, print line $c$ is opposite to print types 3, print line $d$ is opposite to print types 2, and print line $e$ is opposite to print types 1 (see FIG. 8). At this time position the reset symbol $R_N$ is just passing the reading head N (see FIG. 6a), however, at this time position no information line passes the reading heads M (see FIG. 7a). Thus, the coincidence circuits K are not effective. The reset symbol $R_N$ is supplied to the decoding unit D. The decoding circuit (FIG. 5) causes a pulse to appear at the control grid of tube 13. This tube becomes conductive, whereby the relay 14 will be energized so that all contacts 15 are switched. Reset pulses are now sent through all wires $FD_A$ to $FD_J$ which are sufficient to switch all ferrite cores F from state 1 to state 0. Since the core $F_C^1$ is in the state 1, it will be switched back to the state 0, whereby an output pulse occurs in the wire $LF_C^1$. This output pulse obtained by switching from 1 to 0 will—contrary to the output pulse, which is obtained in switching from 0 to 1 and is of opposite polarity—cause the hammer $H_C^1$ to operate. This hammer $H_C^1$ now prints the symbol 3 into the printing line $c$.

The maximum time required for printing all twenty lines $a$ through $t$ of the proposed sequence of numbers is 290.5 time units or approximately 30 revolutions of the reference drum 5.

An average of 100 lines per second will be printed with a conventional drum speed of 6000 r.p.m. for example. Thus the hammer operating time must be in the magnitude of 0.01 sec. which seems to be appropriate. Under the assumption that the distance of consecutive printing lines amounts for instance to 5 mm., an advancing speed of about 50 cm. per sec. results for the record carrier, which also seems to be appropriate. With 100 print positions in one line, the present multiline printing device can achieve a printing speed of about 10,000 characters per sec.

It has been decisive for the control circuits, shown in the previous embodiment and, according to FIG. 1b, consisting essentially of the information storage drum 6, the reference drum 5, the mechanical transmission gearing 7, the coincidence circuits K and the decoding unit D, that after each revolution of the storage drums 5 and 6, respectively, an angularly displacement is effected in the association of the information lines axially arranged on the drum surface 6, with respect to the reference symbols on the drum section 5a. In the example previously shown, this has been achieved mechanically namely by interconnecting a suitable transmission gearing 7 between both storage drums 5 and 6, so that these two drums rotate with different rotary speeds.

However, it is fundamentally possible to bring about electrically this displacement, recognized as essential, in the association of the information lines with the reference symbols. In this case, the method consists in taking suitable provisions so that during each revolution of the storage drum the information lines are read linewise, displaced by one line position relative to the reference symbols and written again. The result of this displacement obtained by electrical means is that only one common storage surface has to be provided for both the information lines and the reference symbols.

An embodiment of this method shall now be described with reference to FIG. 10. The entire printing arrangement (FIG. 10) is to be imagined as composed of FIG. 1a and 10a. The printing mechanism, illustrated in FIG. 1a, remains completely unchanged with respect to the previously shown embodiment. Likewise unchanged remains the arrangement and wiring of the magnet core matrix which comprises the magnetic cores F, the column wires FK, the line wires FD and the selecting wires LF. Further, nothing is changed in the operation of the coincidence units K with respect to the above explained example. Also, nothing essential is changed in the operation of the decoding unit D and in the function of the magnetic reading heads N and M.

Figures 10, 10A:
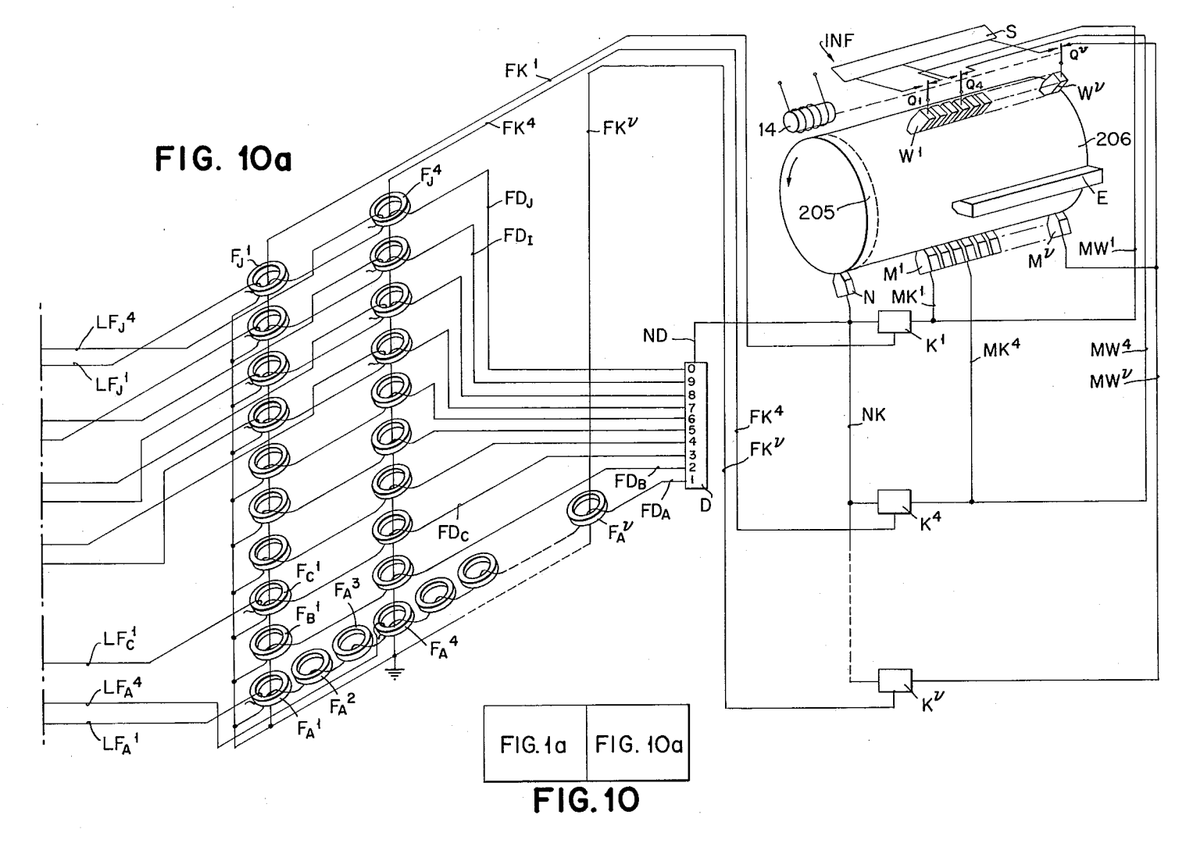
FIG. 10 is a combination of FIG. 1a and FIG. 10a and shows a second embodiment of the printing device.

In the embodiment according to FIG. 10a, on the contrary, a single storage drum surface is provided which is divided into two surface sections 205 and 206.

The surface section 205 carries the coded reference symbols 1, 2 . . . 9, 0 as well as the coded reset symbol R (as in the previous example) and cooperates with the magnetic reading head N. In this respect, reference is made to the fact that it is not necessary for the shown embodiment to provide a surface section similar to the surface section 5b (see FIG. 1b) of the previous embodiment. The function of the trigger gating marking $S_T$ is taken over in the present example by the coded reset symbol R. In this example also, it is not necessary to provide a magnetic head similar to the magnetic head T (see FIG. 1b), the function of which will be taken over by the magnetic reading head N.

The surface section 206 bears the information lines and cooperates with a number of magnetic reading heads M, a number of magnetic writing heads W and an arrangement E for erasing the stored information. This arrangement E can for instance be a number of magnetic erasing heads or a permanent magnet. The individual magnetic heads M, W and E will be arranged preferably alongside each other in axial direction, as shown in FIG. 10a. The arrangement of the magnetic heads M, W and E around the periphery of the drum surface is best seen in FIG. 11, to which reference will be made later for further details.

The magnetic head N is, as in the previous example, connected through the wire ND to the decoding unit D and by means of the wires NK to the various coincidence units K. The magnetic heads M are also connected through the wires MK to the coincidence units K, but in addition also by means of the wires MW and through suitable switch contacts Q, which are shown here as conventional change-over contacts (it is evident that electronic switching means may have to be provided) to the magnetic writing heads W. The writing heads W can be connected to the information storage-register S by means of the switch contacts Q, namely when the relay 14 is energized, whereby a new information line is taken over and written on the drum surface 206. The relay 14 which actuates the switch contacts Q is identical with the relay 14 of the decoding unit (see FIG. 5). The fact shall be remembered that the relay is energized, at precisely the same moment as the magnetic head N reads the reset symbol R. When the relay 14 is in inoperative position, as shown in FIG. 10a, the information line read by the magnetic heads M is simultaneously written again on the drum by the writing heads W. The information lines previously read by the magnetic heads M are deleted when passing the erasing heads E during the continued rotation of the drum.

Figure 11:
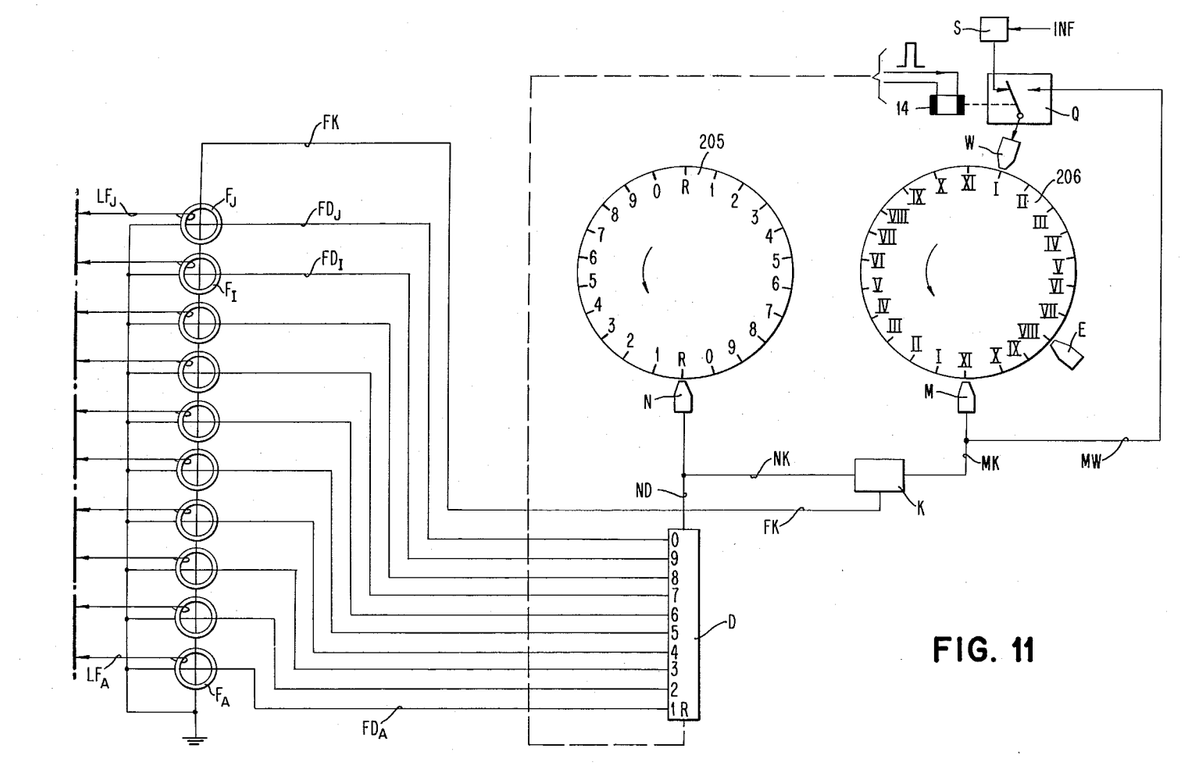
FIG. 11 shows further details of the control elements provided for the example of FIG. 10.

With reference to FIG. 11, the arrangement of the magnetic heads M, W and E as related to the line positions of the drum surface 206, and the distribution of the information lines and the reference symbols on the periphery of the surface sections 206 and 205, shall now be explained. For sake of clarity we shall again limit ourselves to the ten number characters 0 to 9 and consider only one column of the information lines.

Twenty-two positions for the reference symbols are provided on the circumference of the drum section 205 and are equidistantly spaced from each other. They contain in suitably coding two times the eleven different characters R, 1, 2, 3, 4, 5, 6, 7, 8, 9, 0. These reference symbols pass the magnetic reading head N in the indicated direction, whereby they are successively selected and by means of the connecting wires NK and ND fed to the coincidence units K and the decoding unit D in form of electrical pulses.

Twenty-two information line positions are equidistantly spaced around the circumference of the drum section 206. In the drawing these information line positions are designated by the Roman number characters I to XI which all appear twice. The information INF to be printed, when, as indicated, the relay 14 is actuated, is always written in a line position I by means of writing heads W. The reason is the reset symbol R, which when passing the reading head N causes the actuation of the relay 14, at precisely the same moment as a line position I passes the writing head W. In this case, when the relay 14 is energized, the information read by the magnetic head M is not rewritten on the drum surface; it is lost later on by erasure on the magnetic head E. However, this does not matter anymore, since the respective information line is no more needed, because it has already been compared with each of all the reference symbols 1, . . . 9, 0 during the previous revolutions of the drum.

FIGS. 12a to 12d show four different time positions during the course of the control operation.

Figure 12A:
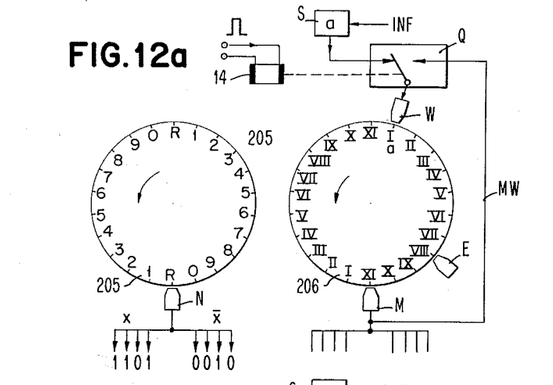
FIGS. 12a to 12d illustrate various time positions in the course of the control process of the printing device according to the second embodiment of the invention.

FIG. 12a shows the writing of an information line "a" in a first line position I.

Figure 12B:
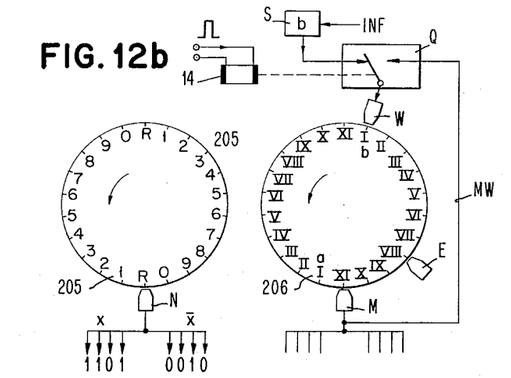

FIG. 12b shows the arrangement half a drum revolution later (11 time units shall correspond to said half revolution). At this instant the information line "b" is written into the second line position I. It is to be noted that the information line "a," located in the opposite first line position I, has at this moment not yet passed the reading heads M.

Figure 12C:
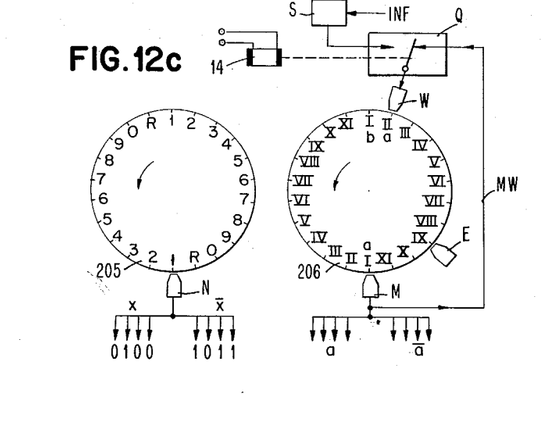

FIG. 12c shows the arrangement one time unit later, when the information line "a" passes the reading heads M. Now this information line is compared with the number symbol "1," which is read at that same moment by the reading head N. An eventual coincidence would cause the setting of a corresponding ferrite core $F_A^1$. Simultaneously, the information line "a" is rewritten into line position II by means of the writing heads W. During continued rotation of the drum at a suitable time position the information line "a" in the first line position I is erased (in passing the erasing magnet E).

Figure 12D:
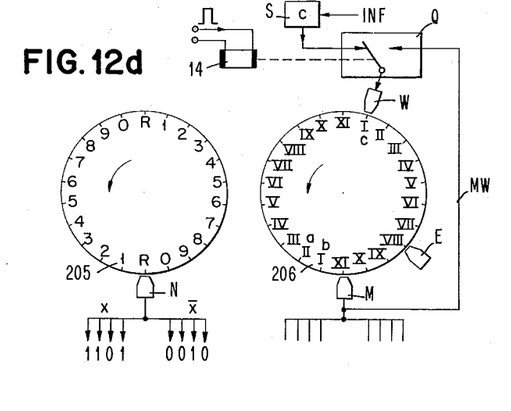

FIG. 12d shows the arrangement ten time units later since the reading head N reads the reset symbol R, the magnetic core matrix is read out and the magnetic cores F which were switched in the previous comparing cycle, during this resetting now effect the actuation of the associated printing hammers. A "1" in the information line "a," which has been found by coincidence, in the just achieved comparing cycle (indicated here by FIG. 12c) would now (indicated by FIG. 12d) be printed on the record medium. Simultaneously, at the time position shown in FIG. 12d, the next information line "c" is written into the line position I by the magnetic writing heads W.

It now appears to be obvious how the cycle of operation continues: in the next following time unit the information line "b" in line position I is compared with the symbol "1" and at the same time written in the opposite line position II. Again one time unit later, the information line "a" in line position II is compared with the number symbol "2" and at the same time written in the opposite line position III. Nine time units later there occurs the resetting of the magnetic cores of the storage matrix, which may have been switched by coincidence, and simultaneously the inwriting of the next information line "d" into the line position I takes place. Then follows the next comparing cycle with simultaneous line displacement, etc.

The association between the continued movement of the record medium, which passes the printing hammers, and the rotary speed of the magnetic drum has to be arranged in the example shown in the present embodiment in such a way, that an advance movement of one printing line of the record carrier corresponds to one half revolution of the drum. The forward movement of the record medium can also take place continuously.

With respect to the hitherto described high speed, multiline printing device another modification is possible by using conventional type bars with individually movable types instead of individually movable print hammers, provide for cooperating with the print types arranged on the surface of a fixed plate.

Another modification can be designed by using a photographic film instead of a paper record sheet, a transparent type character carrying mask or the like instead of the print type-carrying platen, and controllable light sources and optical means instead of print hammers. It is obvious that this mask must be arranged between the light sources and the photographic film.

A further embodiment may use xeroprinting-record carriers instead of a paper record sheet or a photographic film, transparent type-character carrying masks or the like instead of a print type-carrying platen, and controllable light sources and optical means or the like instead of print hammers. A xeroprinting one-line printing device is disclosed for example in U.S. patent specification 2,726,940.

While the invention has been particularly shown and described with reference to preferred embodiments thereof, it will be understood by those skilled in the art that various changes in form and details may be made therein without departing from the spirit and scope of the invention.

What is claimed is:

1. A control device for a multi-line-at-a-time printer having a font of N different data characters and N rows of individually actuable character image producing members adapted to record simultaneously N rows of data character images upon a constantly moving record web under control of coded character indicia; comprising a character emitter having a cycle of operation composed of N time increments, and adapted during each said cycle to produce successive coded signals manifestive of, and in the order of the characters in said font; a data storage device having N-1 rows of data storage positions; means operative during each of a succession of cycles of said emitter for entering into each successive row of data storage positions indicia manifestive of successive rows of data to be printed; means for reading each row of recorded indicia once during each of N cylcles of said emitter and for comparing said indicia with successively different ones of said coded signals, and for producing signals indicating a match between the indicia and the coded signals; a second storage medium device having N rows of storage devices; means under control of said emitter and said signals indicating a match for operating individual ones of said second storage devices; and means operative at a predetermined time at the end of each said cycle for associating the operated ones of said second storage devices with corresponding ones of said character image producing members to operate the image producing members respectively connected thereto.

2. The apparatus of claim 1 wherein the cycle of operation of said character emitter has a duration equal to that time required for the record member to move one line space.

3. In combination with a multi-line-at-a-time printer having a font of N different data characters and N rows of individually actuable character image producing members adapted to record simultaneously N rows of data character images upon a constantly moving record member under control of coded character indicia, a character emitter having a cycle of operation composed of N time increments and adapted during each said cycle to produce successive coded signals manifestive of and in the order of the characters in said font; a data storage device having N-1 rows of data storage positions; means operative during each of a succession of cycles of said emitter for entering into each successive row of data storage devices indicia manifestive of successive rows of data to be printed; means for reading each row of recorded indicia once during each of N cycles of said emitter, and for comparing said indicia with successively different ones of said coded signals to produce signals indicating a match between the indicia and the coded signals; a second storage device having N rows of storage devices; means under control of said emitter and said signals indicating a match for operating individual ones of said second storage devices; and means operative at a predetermined time at the end of each said cycle for associating the operated ones of said second storage devices with corresponding ones of said character image producing members and for resetting said storage devices.

4. A control device for a multi-line-at-a-time printer having a font of N different data characters and N rows of individually actuable character image producing members adapted to record simultaneously N rows of data character images upon a constantly moving record member under control of coded character indicia, comprising a first constantly rotating magnetic drum having permanently recorded indicia manifestive of and in the order of said N characters, the said indicia occupying equi-angularly spaced positions on said drum; means for reading the said character indicia; a second magnetic drum rotating at $$\frac{N-1}{N}$$

the rotational speed of said first drum; means under the control of said first drum for recording on said second drum variable indicia manifestive of each successive row of data characters to be controllably printed at a fixed time during each successive revolution of said first drum; transducer means for reading said rows of variable indicia; means for comparing said character indicia and said variable indicia and for producing a signal indicative of a match therebetween; a magnetic core storage device having N rows of columns of magnetic cores each of said columns having a common winding and each of said rows having a common winding; means under control of said first drum for applying half-select driving impulses sequentially to each of the row windings; means under control of said comparing devices and responsive to said match indicative signals for applying a half select signal to the column windings to coincidently switch the corresponding cores; and means under control of said first drum for resetting the previously switched cores, each of which is operatively connected to a corresponding one of said image producing members.

5. In combination with a multi-line-at-a-time printer having a matrix of individually actuable character image producing members arranged in columns and rows, each individual row containing the same character, and each column containing the same succession of characters, and means for moving a record-receiving web in juxtaposition to said members and parallel to the columns thereof at a constant speed such that any given web area traverses the distance between said rows in a constant predetermined interval of time; a matrix storage device having individual storage units arranged in columns and rows corresponding to said members, the said units being individually operatively connected to corresponding ones of said members; a cyclical storage device having a cycle time equal to said predetremined interval of time; means for entering in said cyclical storage device coded indicia manifestive of each successive row of data to be imprinted during each successive cycle of said storage device; means for emitting a succession of character identification signals manifestive of and in the order of the characters in said column of members during each said predetermined time interval; means for comparing said indicia and said character identification signals during each such cycle of said cyclical storage device such that each row is compared against a different indicia in each cycle of operation of said cyclical storage device, the said means being adapted to produce signals indicative of the match; means for routing said match signals to corresponding ones of said matrix storage units, and operative to store the matches therein; means operative at the end of each of said predetermined time intervals for causing said storage units to operate the corresponding connected image producing members.

6. A control device for a multi-line-at-a-time printer having a font of N different data characters and N rows of individually actuable character image producing members adapted to record simultaneously N rows of data character images upon a constantly moving record web under control of coded character indicia, comprising a magnetic drum rotated at a constant speed in synchronism with the web such that the web feeds the distance between adjacent rows of character image producing members for each ½ revolution of said drum, data writing transducers disposed adjacent to said drum; data reading transducers disposed adjacent to said drum and angularly displaced from said writing transducers in the direction of rotation of said drum by $$\frac{N+2}{2(N+1)}$$

of a revolution; means for energizing said writing transducers from an external data source at a fixed time in every ½ revolution of said drum to record thereon indicia manifestive of a succession of rows of data to be controllably imprinted in corresponding rows on said web; a character emitter synchronized with the rotation of said drum and adapted to emit a succession of coded signals manifestive of the order of the N characters in said font, the signals occurring at $N+1$ equal time intervals between said fixed times in each ½ revolution of said drum; means connecting said reading transducers with said writing transducers when said indicia are being read by said reading transducers; erasing means disposed after said reading transducers in the direction of travel; comparing means connected to said character emitter and said reading transducers and adapted to produce a signal indicative of a match therebetween; a magnetic core storage matrix having N rows of storage cores, each core thereof being operatively connected to a corresponding one of said image producing members; means responsive to said match indicating signals for switching corresponding cores in said matrix; and means operative at said fixed times to cause the switched cores to operate the character image producing members associated therewith.

7. A control device for a printer capable of registering upon a constantly moving record-receiving web any one of N different character images in any selected column and row position on said web under the control of codal input data, the said printer having N rows of individually operable image producing members, the members of the different rows being capable of producing a different character image; comprising a character emitter having a cycle of operation composed of N time increments, and adapted to produce successive codal manifestiations of each of said N different characters during each such cycle of operation; a data storage device having N-1 storage positions; means for entering codal data manifestations of each successive row of data to be printed in each successive one of said storage positions during each successive cycle of operation of said character emitter; means for reading each of the stored data manifestations once during each of N successive cycles of operation of said emitter, and for comparing each of said codal manifestations with a different successive one of said codal manifestations for N cycles of operation of said emitter, and for producing a signal upon each like comparison; a second storage device having N storage devices per column, each one connected to a corresponding one of said individually operable image producing members; means under the conjoint control of said character emitter and said signal for operating a corresponding one of said second storage devices upon the detection of a like comparison; and means under control of the operated ones of said second storage devices for actuating the corresponding image producing members at a predetermined time at the end of each cycle of operation of said emitter.

8. A control device for a multi-line-at-a-time printer of the type having a front of N different data characters and N rows of individually actuable character image producing members adapted to record simultaneously N rows of data character images upon a record receiving web advanced with uniform velocity past said members so as to align any given web area with successively different ones of said image producing members after the lapse of a time interval consisting of T units; comprising a character emitter adapted to emit a succession of N character identification signals manifestive of the identity and order of the characters in said font during every said time interval of T units; a storage device for storing indicia manifestive of the respective rows of data to be controllably imprinted on said web; means for entering into said storage device indicia manifestive of the next successive row of data to be printed in each said time interval; means for reading every row of recorded indicia once during each said time interval, and for comparing each successive row with a respective successive one of said character identification signals during a single time interval of T units, and producing an impulse upon a match between said signals and said indicia; means for precessing the reading of said rows of indicia during each successive time interval of T units such that each row of data is successively compared with the next succeeding one of said character identification signals during each successive time interval; a matrix storage device having an individual storage cell operatively connected to each of said image producing devices; means responsive to each separate match impulse during any one time interval of T time units for registering the match in a corresponding one of said cells; and means active at the end of each of said time intervals of T time units for causing those cells registering a match to operate the image producing members respectively connected thereto.

9. The control device of claim 8 wherein said character emitter comprises a first constantly rotating magnetic drum having a periodicity of one revolution in T time units and a succession of N permanently recorded character identification signals equi-angularly spaced around the periphery thereof; and the said indicia storage device comprises a second magnetic drum geared to said first drum so as to have a periodicity of one revolution in $$\frac{(N-1)}{N}$$

T time units; and separate writing and reading transducers spaced ½ revolution apart, whereby by virtue of the speed relationship of the two drums the reading of each row of indicia is precessed one character position for each revolution of said first drum.

10. The control device of claim 8 wherein said character emitter comprises a magnetic drum having a periodicity of one revolution in 2T time units the drum having one set of N permanently recorded character identification signals in each half thereof; and the storage device includes the same magnetic drum, and writing and reading transducers coacting therewith and angularly separated by $$\frac{N+2}{2(N+1)}$$

of a revolution, the said writing transducers being energized at a fixed time in each said time interval to record a new row of indicia, and at other times being energized from said reading transducers to re-record the rows of indicia precessively with respect to said character identification signals.

References Cited in the file of this patent
UNITED STATES PATENTS

| | | |
|---|---|---|
| 2,708,267 | Weidenhammer | May 10, 1955 |
| 2,860,323 | Burkhart et al. | Nov. 11, 1958 |
| 2,873,666 | Stiefel | Feb. 17, 1959 |
| 3,001,180 | Williams | Sept. 19, 1961 |